United States Patent [19]
Anderson et al.

[11] Patent Number: 5,474,405
[45] Date of Patent: Dec. 12, 1995

[54] LOW ELEVATION WALL CONSTRUCTION

[75] Inventors: Peter L. Anderson, North Reading, Mass.; Michael J. Cowell, Leesburg; Dan J. Hotek, Reston, both of Va.

[73] Assignee: Societe Civile des Brevets Henri C. Vidal, Le Pecq, France

[21] Appl. No.: 137,585

[22] Filed: Oct. 15, 1993

Related U.S. Application Data

[63] Continuation-in-part of Ser. No. 40,904, Mar. 31, 1993, and a continuation-in-part of Ser. No. 9,442, Jun. 4, 1993, and a continuation-in-part of Ser. No. 9,214, Jun. 7, 1993, Pat. No. Des. 345,426, and a continuation-in-part of Ser. No. 11,818, Aug. 16, 1993, and a continuation-in-part of Ser. No. 108,933, Aug. 18, 1993.

[51] Int. Cl.$^6$ ............................................. E02D 29/02
[52] U.S. Cl. ........................... 405/286; 405/262; 405/284
[58] Field of Search .......................... 405/262, 284, 405/286, 285, 287; 52/562, 582.1, 584.1, 585.1, 596, 604, 606, 608

[56] References Cited

U.S. PATENT DOCUMENTS

| | | |
|---|---|---|
| 126,547 | 5/1872 | Hickcox . |
| 228,052 | 5/1880 | Frost . |
| D. 237,704 | 11/1975 | Lane .......................................... D18/2 |
| 384,541 | 6/1888 | Palmer ................................... 52/584.1 |
| 566,924 | 9/1896 | Morrin . |
| 654,733 | 7/1900 | Humes ..................................... 52/562 |

(List continued on next page.)

FOREIGN PATENT DOCUMENTS

| | | |
|---|---|---|
| 2031077 | 5/1991 | Canada . |
| 0079880 | 5/1983 | European Pat. Off. . |
| 0047717 | 6/1983 | European Pat. Off. . |

(List continued on next page.)

OTHER PUBLICATIONS

AASHTO–AGC–ARTBA Joint Committee, Subcommittee On New Highway Materials, Task force 27 Report "In Situ Soil Improvement Techniques" (Undated).
Silifrance Product Information Sheet (Undated).
Besser Co. "The Beauty of Concrete Block" (Undated).
Rockwood Classic Retaining Wall System Product Information Sheet (Undated).
Earthworks™ Retaining Wall System Product Information Sheet (Undated).
EarthStone™ Erosion Control/Retaining Wall System Product Information Sheet (Undated).
Rockwood Retaining Walls, Inc. Product Information Sheet (Undated).
RISI Stone Retaining Wall Systems "Preserving Our Environment" Information Brochure (1976).
Reinforced Earth Co.® "Design of Live Storage Structures Using Reinforced Earth®" (1983).
Reinforced Earth Co.® "Industrial Applications of Reinforced Earth® Structures" (1988).
Versa–Lok® Retaining Wall Systems Information Brochure (1989).
Structural Block Systems, Inc. "Introducing Radial Block" (1990).
Allan Block™ Retaining Walls "A Mortarless, Stackable Concrete Block Retaining Wall System" (1990).

(List continued on next page.)

*Primary Examiner*—David H. Corbin
*Attorney, Agent, or Firm*—Banner & Allegretti, Ltd.

[57] ABSTRACT

A retaining wall construction comprises modular facing blocks connected by fasteners to anchoring blocks positioned behind the facing blocks. The facing blocks are arranged in courses which overlap one another. The facing blocks, as well as the anchor blocks, have hollow, vertical throughbores. This enables interconnection of the back wall of the facing block with the anchor block by means of various types of fasteners. The retaining wall construction is especially useful in the construction of low height, gravity type walls.

20 Claims, 12 Drawing Sheets

U.S. PATENT DOCUMENTS

| | | | |
|---|---|---|---|
| 810,748 | 1/1906 | Haller et al. . | |
| 1,092,621 | 4/1914 | Worner . | |
| 1,414,444 | 5/1922 | Straight . | |
| 1,456,498 | 5/1923 | Binns . | |
| 1,762,343 | 6/1930 | Munster . | |
| 1,818,416 | 8/1931 | Meara . | |
| 2,235,646 | 3/1941 | Schaffer | 72/101 |
| 2,252,155 | 8/1941 | Baldwin | 72/103 |
| 2,313,363 | 3/1943 | Schmitt . | |
| 2,882,689 | 4/1959 | Huch et al. | 61/35 |
| 2,963,828 | 12/1960 | Belliveau | 50/425 |
| 3,036,407 | 5/1962 | Dixon | 50/443 |
| 3,252,287 | 5/1966 | Suzuki | 61/5 |
| 3,274,742 | 9/1966 | Paul, Jr. et al. | 52/245 |
| 3,332,187 | 7/1967 | Arcari | 52/309 |
| 3,390,502 | 7/1968 | Carroll | 52/424 |
| 3,418,774 | 12/1968 | Kocher et al. | 52/608 |
| 3,430,404 | 3/1969 | Muse | 52/439 |
| 3,557,505 | 1/1971 | Kual | 52/275 |
| 3,686,873 | 8/1972 | Vidal | 61/39 |
| 3,936,987 | 2/1976 | Calvin | 52/309 |
| 3,995,434 | 12/1976 | Kato et al. | 61/4 |
| 3,998,022 | 12/1976 | Muse | 52/574 |
| 4,016,693 | 4/1977 | Warren | 52/405 |
| 4,110,949 | 9/1978 | Cambiuzzi et al. | 52/437 |
| 4,116,010 | 9/1978 | Vidal | 405/262 |
| 4,177,617 | 12/1979 | DeLuca et al. | 52/562 |
| 4,207,718 | 6/1980 | Schaaf et al. | 52/585 |
| 4,208,850 | 6/1980 | Collier | 52/285 |
| 4,228,628 | 10/1980 | Schlomann | 52/438 |
| 4,229,123 | 10/1980 | Heinzmann | 405/273 |
| 4,312,606 | 1/1982 | Sarikelle | 405/286 |
| 4,324,508 | 4/1982 | Hilfiker et al. | 405/284 |
| 4,329,089 | 5/1982 | Hilfiker et al. | 405/262 |
| 4,335,549 | 6/1982 | Dean, Jr. | 52/98 |
| 4,449,857 | 5/1984 | Davis | 405/286 |
| 4,454,699 | 6/1984 | Strobl | 52/585 |
| 4,470,728 | 9/1984 | Broadbent | 405/284 |
| 4,496,266 | 1/1985 | Ruckstuhl | 404/41 |
| 4,505,621 | 3/1985 | Hilfiker et al. | 405/284 |
| 4,524,551 | 6/1985 | Scheiwiller | 52/98 |
| 4,572,699 | 2/1986 | Rinninger | 404/42 |
| 4,725,170 | 2/1988 | Davis | 405/286 |
| 4,776,728 | 10/1988 | Sprehn . | |
| 4,802,318 | 2/1989 | Snitovski | 52/562 X |
| 4,802,320 | 2/1989 | Forsberg | 52/608 |
| 4,909,010 | 3/1990 | Gravier | 52/609 |
| 4,914,876 | 4/1990 | Forsberg | 52/169.4 |
| 4,961,673 | 10/1990 | Pagano et al. | 405/287 |
| 4,998,397 | 3/1991 | Orton | 52/715 |
| 5,004,376 | 4/1991 | Vidal et al. | 405/284 |
| 5,091,247 | 2/1992 | Willibey et al. | 428/255 |
| 5,178,492 | 1/1993 | Meheen | 405/284 |
| 5,350,256 | 9/1994 | Hammer | 405/286 |

FOREIGN PATENT DOCUMENTS

| | | | |
|---|---|---|---|
| 0047718 | 5/1984 | European Pat. Off. . | |
| 0170113 | 2/1986 | European Pat. Off. . | |
| 0212357 | 3/1987 | European Pat. Off. . | |
| 0430890A1 | 6/1991 | European Pat. Off. . | |
| 0472993 | 3/1992 | European Pat. Off. . | |
| 2367147 | 5/0578 | France . | |
| 392474 | 11/1908 | France . | |
| 1129634 | 1/1957 | France | 52/584.1 |
| 1360872 | 4/1963 | France . | |
| 2216823 | 8/1974 | France . | |
| 7528079 | 9/1975 | France . | |
| 2610962 | 8/1988 | France . | |
| 2633650 | 1/1990 | France . | |
| 2414202 | 10/1975 | Germany . | |
| 2944550 | 9/1981 | Germany . | |
| 3025883 | 1/1982 | Germany . | |
| 3401629A1 | 7/1984 | Germany . | |
| 4103330 | 9/1991 | Germany . | |
| 586016 | 9/1981 | Japan . | |
| 84735 | 6/1920 | Sweden . | |
| 205452 | 9/1939 | Sweden . | |
| 27174 | of 1930 | U.S.S.R. . | |
| 894038 | 12/1981 | U.S.S.R. . | |
| 1090803A | 5/1984 | U.S.S.R. . | |
| 336 | of 1871 | United Kingdom . | |
| 14528 | of 1913 | United Kingdom . | |
| 120872 | 11/1918 | United Kingdom | 52/584.1 |
| 1385207 | 2/1975 | United Kingdom . | |
| 2014222 | 11/1979 | United Kingdom . | |
| 2127872 | 4/1984 | United Kingdom . | |
| 383156103 | 11/1992 | United Kingdom . | |
| 8802050 | 3/1988 | WIPO . | |

OTHER PUBLICATIONS

Interim, Highway Bridges, Division I—Design, 5.8.7.2 "Polymeric Reinforcements" (1991).
Westblock Products, Inc. "GravityStone™" (1992).
Genesis™ Highway Wall System (1992).
Hunziker "Cobra" (1992).
Keystone™ Retaining Wall Systems "Standard Unit" (1993).
Keystone™ Retaining Wall Systems "Mini and Cap Unit" (1993).
Publication "Modular Concrete Block" (1984).
Publication "Paving Stone: A New Look with Old World Charm" (1984).
Publication "Methods of Making Split Corners" (1985).
Hollow Building Assoc. Handbook "Standard Load–Bearing Wall Tile" (1924).
Concrete Masonry Pictorial, vol. 33, No. 3, ©1977 p. 5.
The Contractor, vol. 2 No. 9, Oct. 1987, pp. 13–16.
Tensar Concrete GeoWall Brochure (1986).

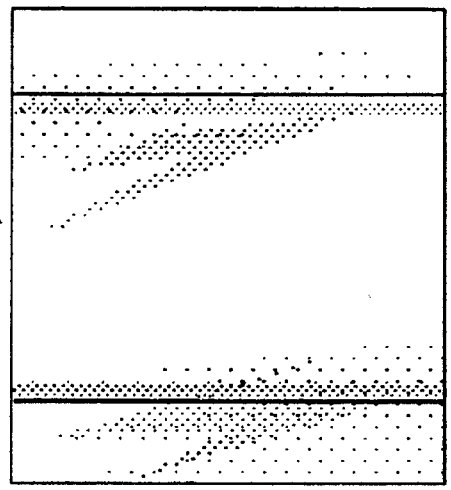
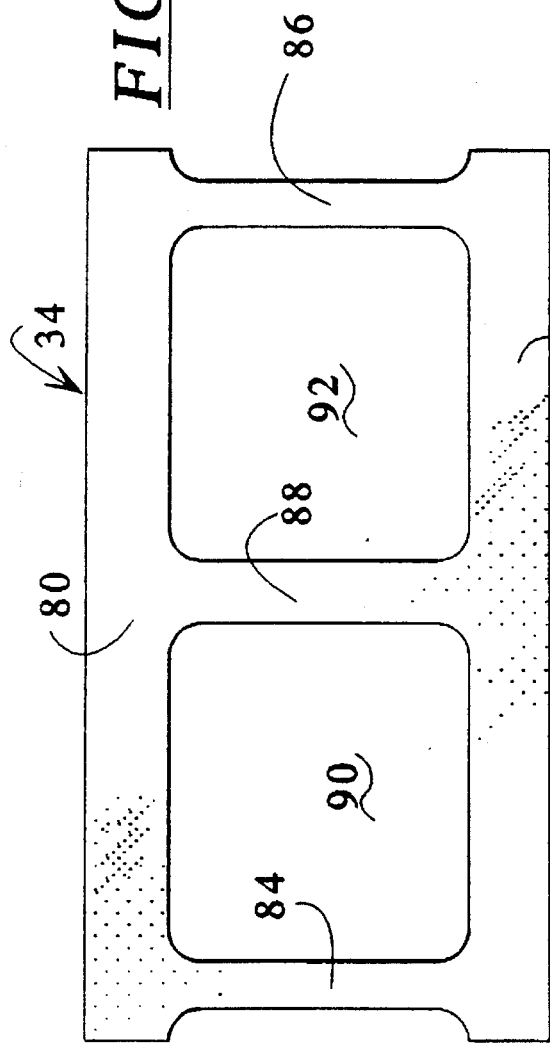
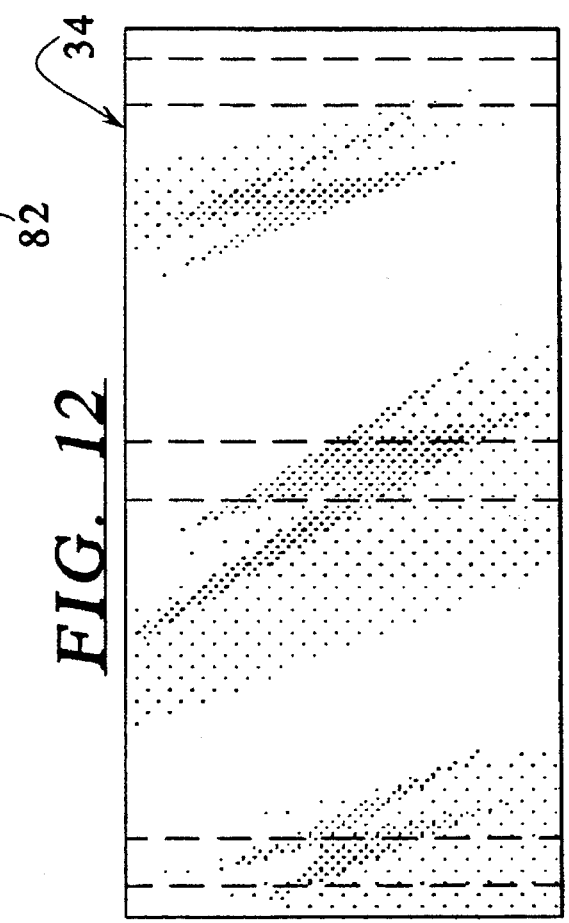

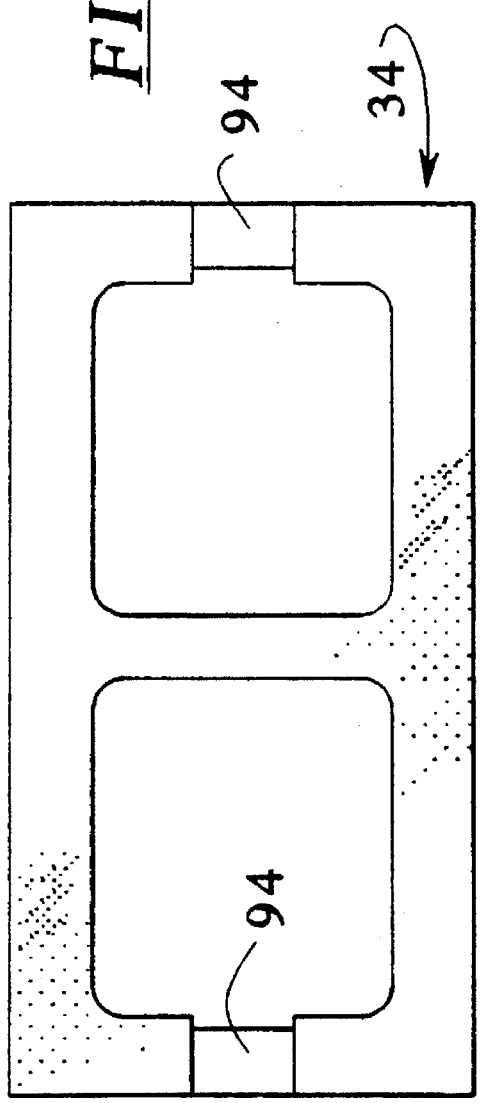
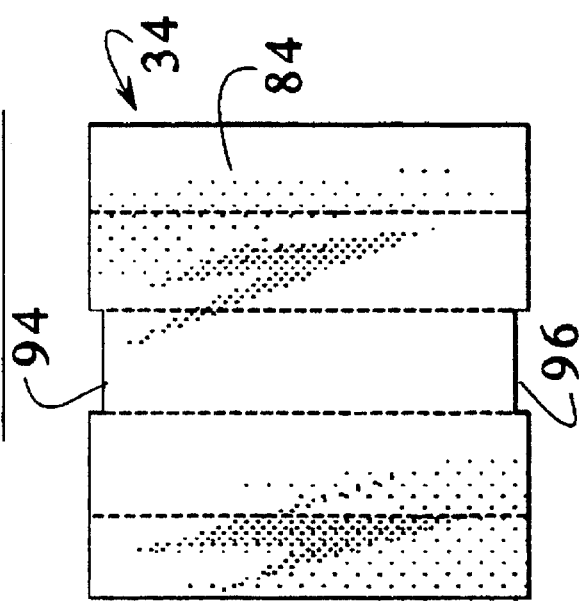
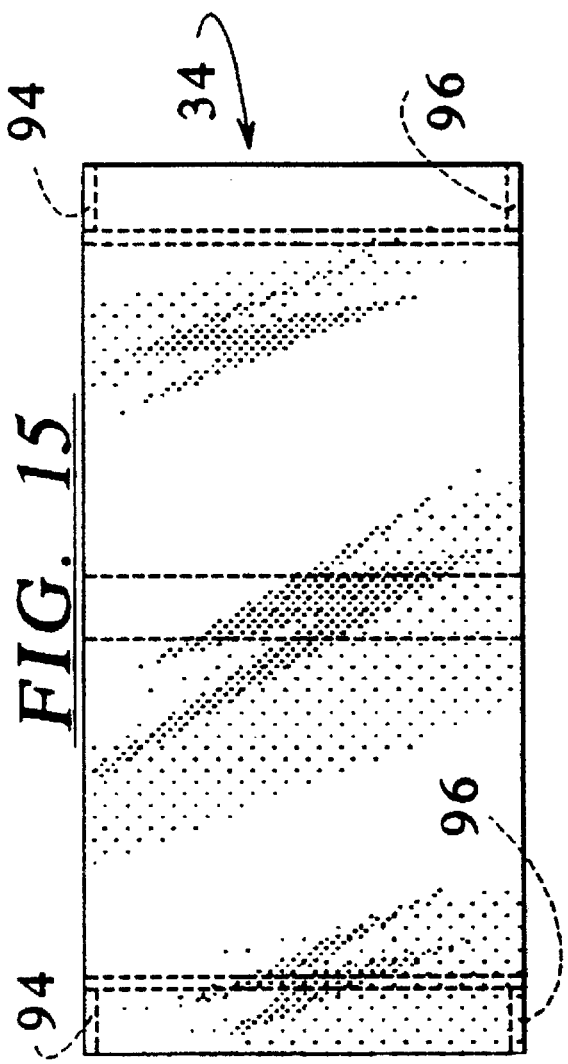

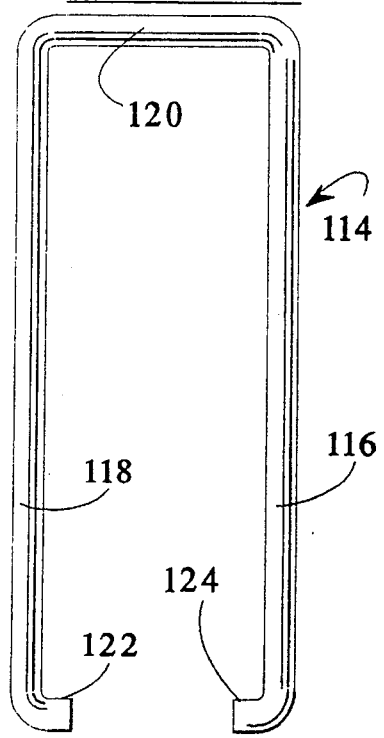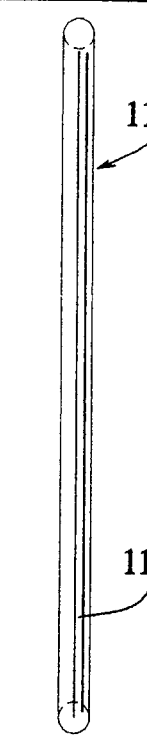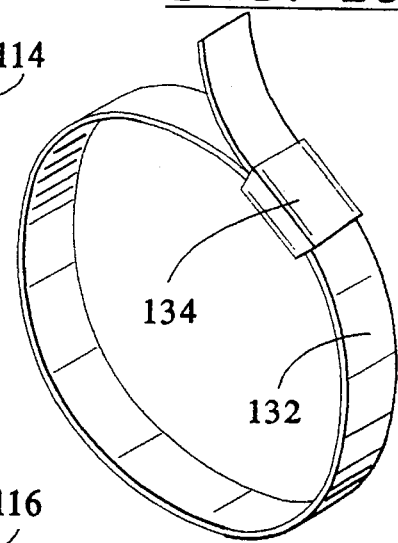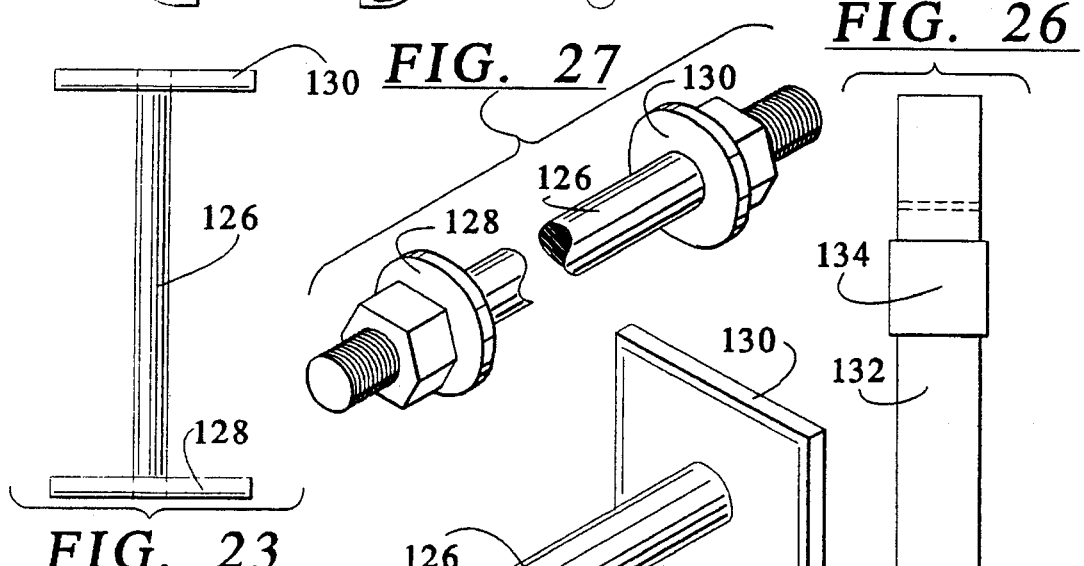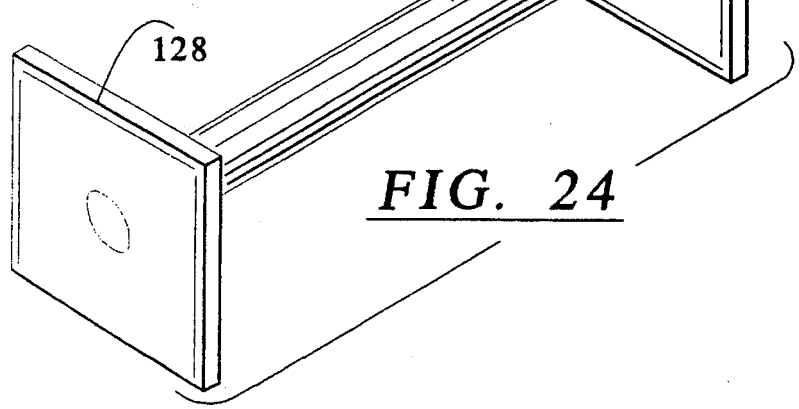

LOW ELEVATION WALL CONSTRUCTION

CROSS-REFERENCE TO RELATED APPLICATIONS

This is a continuation-in-part of application Ser. No. 08/040,904 filed Mar. 31, 1993; design patent application Ser. No. 29/009,442 filed Jun. 4, 1993; design patent application Ser. No. 29/009,214 filed Jun. 7, 1993, now U.S. Pat. No. Des. D345,426; design patent application Ser. No. 29/011,818 filed Aug. 16, 1993; and application Ser. No. 08/108,933 filed Aug. 18, 1993; all of which are currently pending in the U.S. Patent Office.

BACKGROUND OF THE INVENTION

This invention relates to an improved retaining wall construction and, more particularly, to a construction which is especially useful as a lower height, gravity wall.

Utilization of precast blocks for construction of gravity walls and other forms of earth retaining embankments is taught in various prior art patents.

These patents depict various types of precast blocks in combination with various types of anchoring or stabilizing elements and compacted earth in order to provide a retaining wall construction. The facing blocks for such constructions often have a very complex shape thereby rendering the block casting operation complex or difficult and also rendering manipulation of the blocks cumbersome and/or difficult. Thus, there has developed a need, especially with respect to walls having a lower height, to provide a methodology for construction of a wall using precast concrete blocks of simple configuration in combination with anchoring and other elements, also having a simple configuration. Also, the blocks should be light weight and easy to manipulate and assemble.

SUMMARY OF THE INVENTION

Briefly, the present invention comprises a retaining wall construction which fabricated from a plurality of generally modular facing blocks arranged in horizontal layers or courses with the vertically adjacent blocks overlapping one another, at least in part, to define a mosaic pattern. The blocks are precast and have a generally rectangular front face, a hollow core or vertical throughbore, a back wall and generally converging side walls. Attached to the back wall are anchoring blocks which are typically precast, rectangular parallelpiped concrete blocks having vertical throughbores. The sides of the anchoring blocks are positioned against the back wall of the facing blocks and retained there by straps or other types of fasteners. A series of anchoring blocks may be connected to one another to define an anchor or reinforcing element which is maintained within earth or particulate material compacted on the back side, of the gravity wall. Various types of fasteners are disclosed for connecting the blocks to one another. Various arrangements for stacking the blocks relative to each other and in combination are also disclosed. Constructions for corners, as well as a cap block arrangement are also disclosed.

Thus it is an object of the invention to provide an improved retaining wall construction comprised of simple, easily handled component parts.

It is a further object of the invention to provide an improved retaining wall construction which is economical to assemble and wherein the component parts are very economical to make.

Yet a further object of the invention is to provide an improved retaining wall or gravity type wall which is especially useful for the construction of lower height retaining walls.

Another object of the invention is to provide an improved retaining wall construction which is fabricated from easily manufactured component parts as well as component parts which are readily available.

These and other objects, advantages and features of the invention will be set forth in greater detail below.

BRIEF DESCRIPTION OF THE DRAWING

In the detailed description which follows reference will be made to the drawing comprised of the following figures:

FIG. 10 is a top plan view of a typical anchor block used to practice the invention;

FIG. 11 is an end view of the anchor block of FIG. 10;

FIG. 12 is a side view of the anchor block of FIG. 10;

FIG. 13 is a top plan view of an alternate anchor block;

FIG. 14 is an end view of the block of FIG. 13;

FIG. 15 is a side view of the block of FIG. 13;

FIG. 21 is a front view of a third alternate clip design;

FIG. 22 is a side view of the clip of FIG. 21;

FIG. 23 is a top view of a further alternate fastener design;

FIG. 24 is an isometric view of the fastener of FIG. 23;

FIG. 25 is an isometric view of a flexible strap used as a fastener to connect adjacent blocks;

FIG. 26 is a side view of the strap of FIG. 25; and

FIG. 27 is an isometric view of a final alternate fastener.

DETAILED DESCRIPTION OF THE PREFERRED EMBODIMENT

Overview

Figure 1:
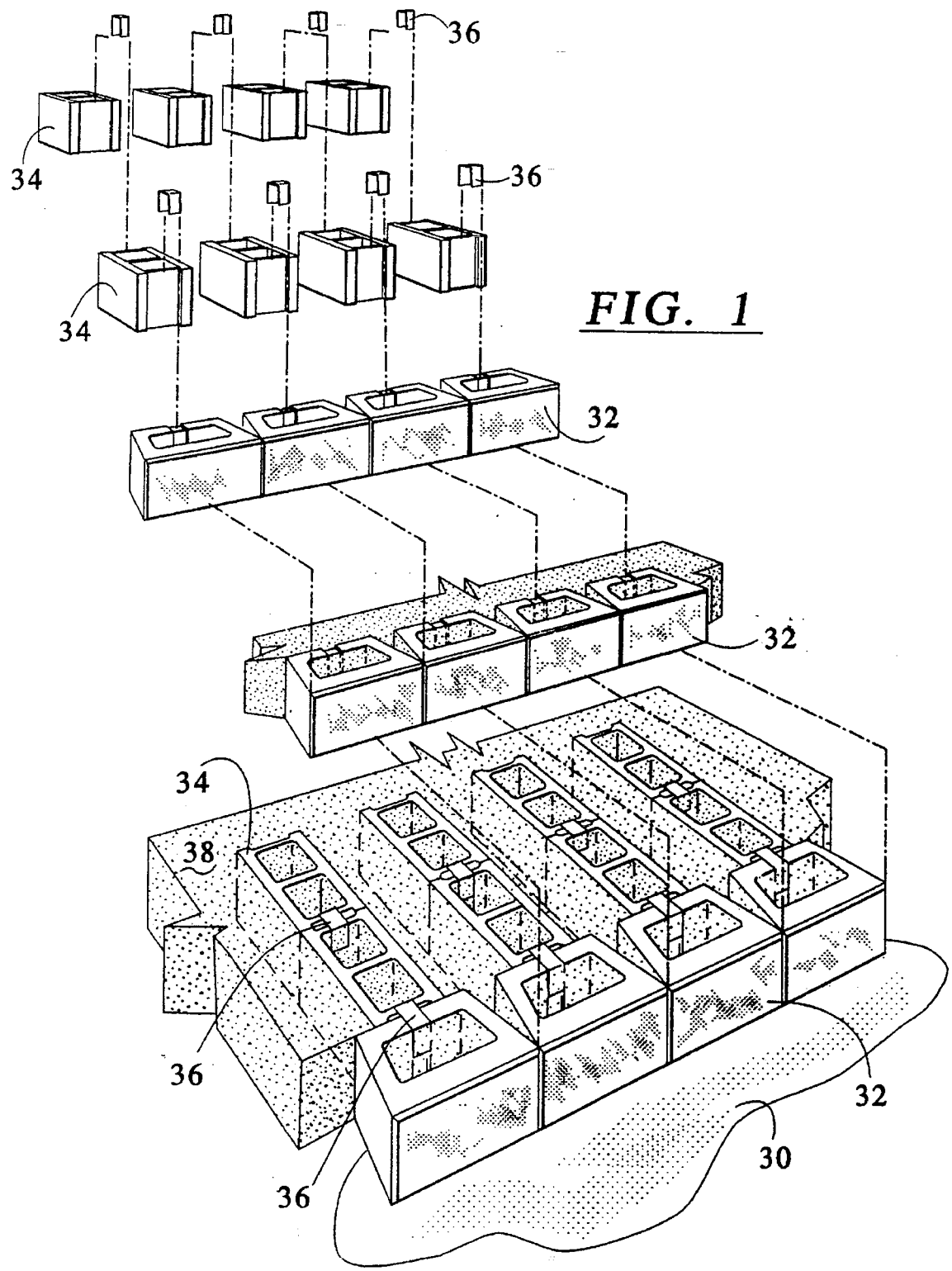
FIG. 1 is a cut-away, exploded isometric view of a typical retaining wall construction of the invention.
Figure 2:
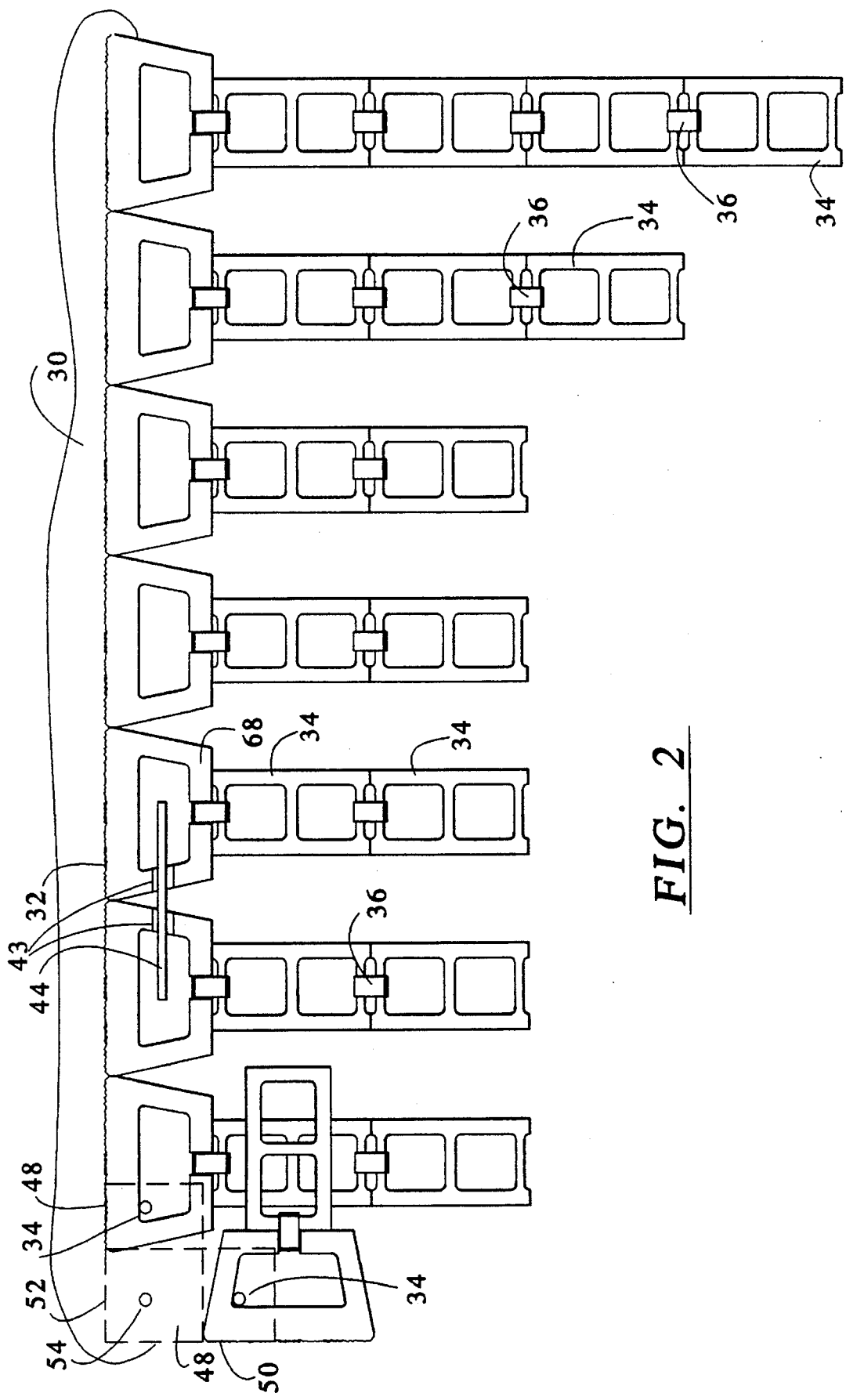
FIG. 2 is a top plan view of a wall of the type shown in FIG. 1, wherein a right angle corner is incorporated in the wall.
Figure 3:
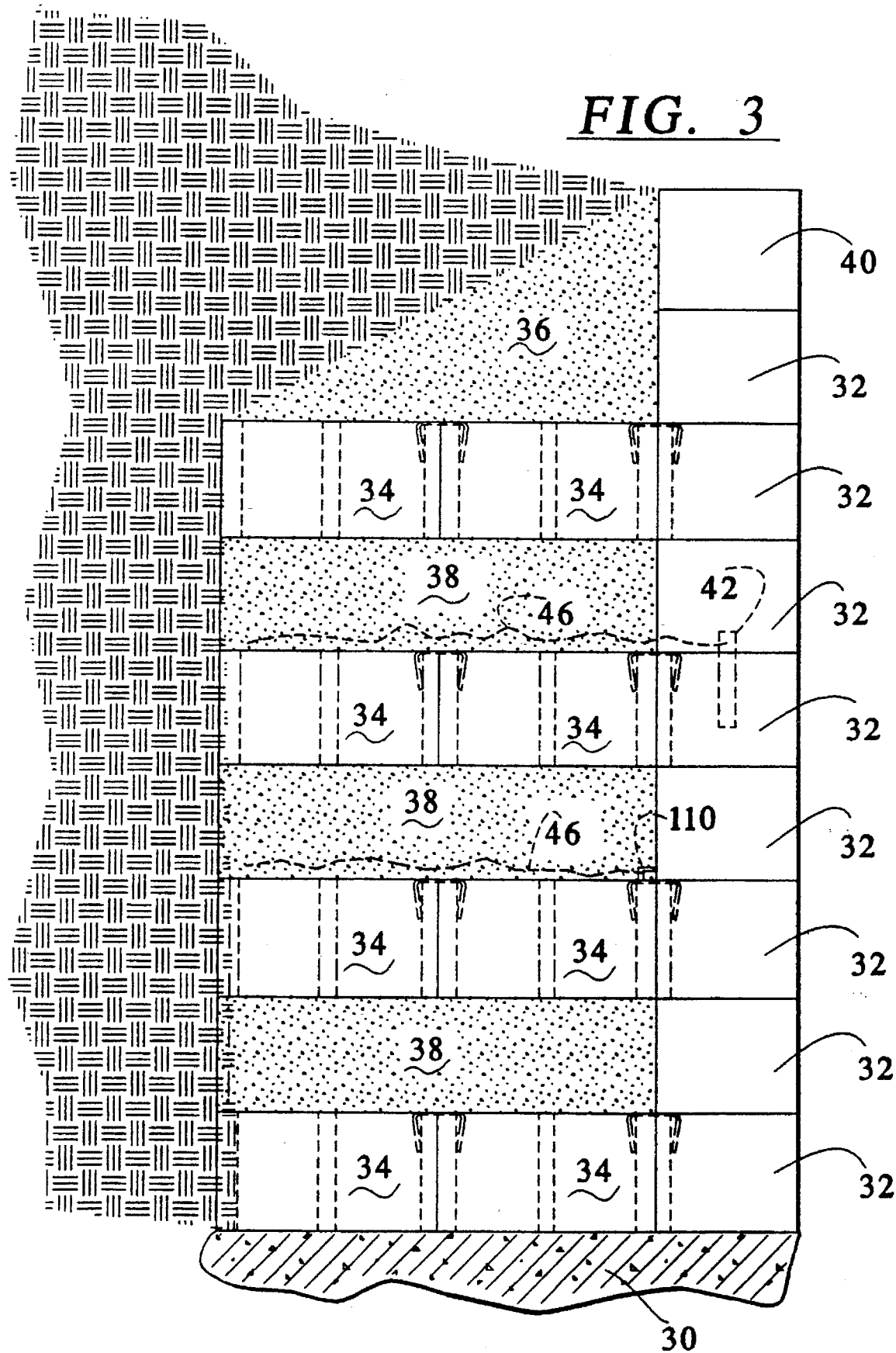
FIG. 3 is a side elevation of a wall of the type shown in FIG. 1.
Figure 4:
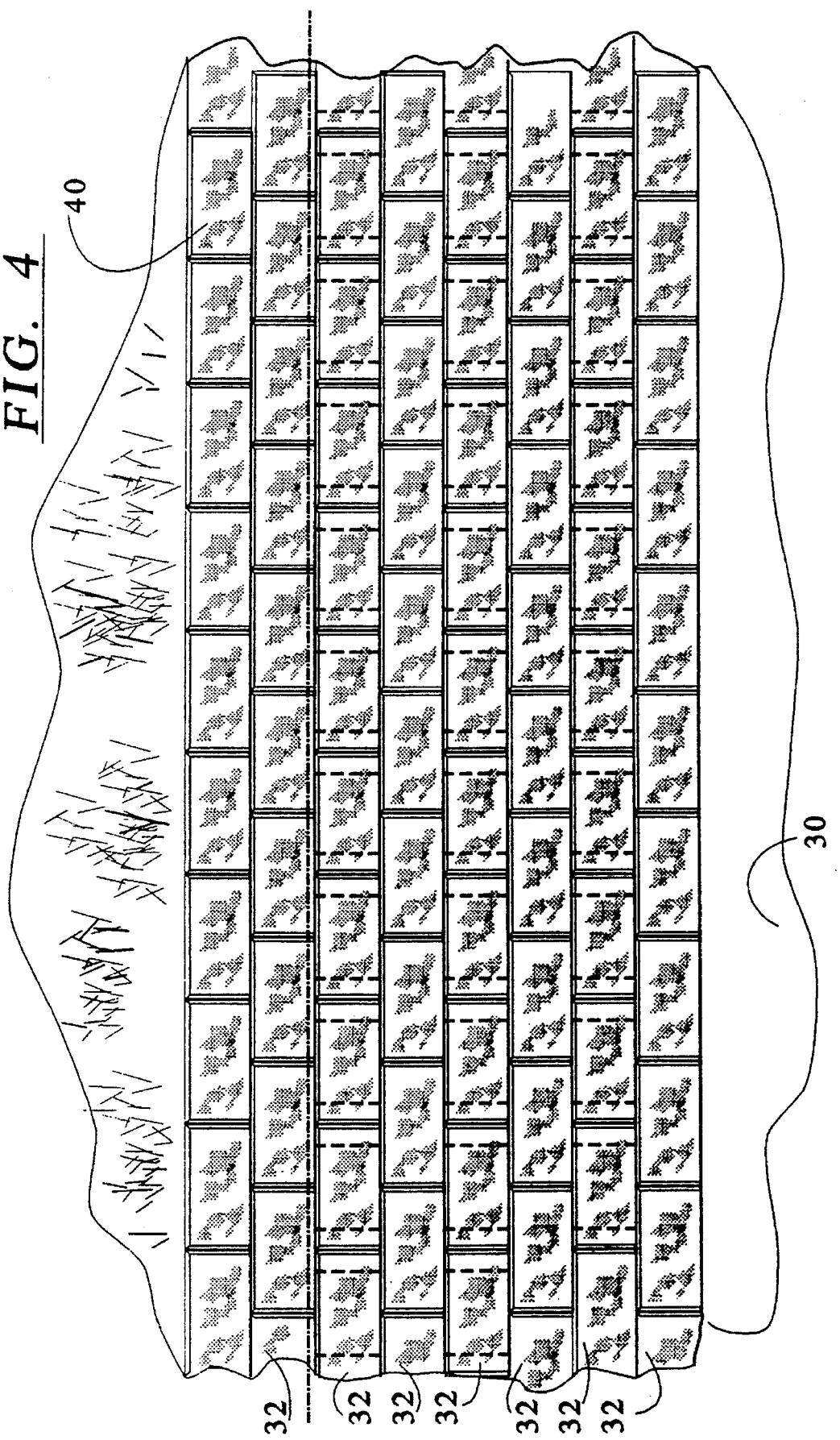
FIG. 4 is a front elevation of a wall of the type shown in FIG. 1.

FIGS. 1 through 4 provide a general overview of the gravity wall or retaining wall of the invention. The wall is typically positioned on a footing or compacted, horizontal surface 30. The wall is comprised of horizontal rows of front facing blocks 32 (one block of each row marked, as examples) which are arranged in layers or courses on top of one another. Most typically, the facing blocks 32 of vertically adjacent layers or courses overlap one another laterally, at least in part, as best seen in FIG. 4. Generally the blocks 32 are not set back, but rather are stacked with their front faces defining a planar surface. They may, however, be set back.

The facing blocks 32 are connected to anchor blocks 34 (one block of each row marked, as representative) attached to the back side or back wall 68 (see FIG. 2; one back wall marked, as representative) of selected facing blocks 32. The anchor blocks 34 are interconnected by means of fasteners or clips 36 (one clip of each row marked, as representative). The facing blocks 32 include throughbores 70 (see FIG. 2; one representative throughbore marked) into which gravel or other particulate material is placed. The anchor blocks 34 are attached to selected layers or courses of facing blocks 32 and are surrounded by compacted particulate material 38 (see FIGS. 1 and 3). The entire assembly is built up in courses or layers and the blocks 32 of the top course constitute cap blocks 40 (see FIG. 4) defining a cap of the retaining wall construction.

The facing blocks 32, as well as the anchor blocks 34, may be fabricated from dry cast concrete. The facing blocks 32 as well as the anchor 34 blocks are generally modular and generally the size of typical concrete blocks so that they may be easily manually manipulated. The facing blocks 32 are of a simple design which can be easily cast and easily manipulated into a position to form the wall. The face of the facing blocks 32 may be textured or otherwise shaped in a desired configuration.

The facing blocks 32 may be vertically connected by positioning rods, stakes or other members 42 (see FIG. 3; one representative member marked) in the hollow spaces of adjacent blocks 32. The facing blocks 32 may be horizontally connected by means of rigid horizontal cross members 44 (see FIG. 2; one representative member marked), for example in channels. Another means for interconnecting the facing blocks 32 as well as a means for providing reinforcement of the particulate material 38 comprises a fabric, geotextile or geogrid material 46 (see FIGS. 3 and 5) retained by the members 42, for example, and projecting into the particulate material 38.

Numerous permutations and combinations of the described elements are possible. Moreover, numerous alternative configurations of the fasteners or clips 36 are possible. Various alternatives of the anchor blocks 34 may also be used, though it is preferable to use a standard concrete block construction. The following description discusses therefore some of the variations and permutations of the basic construction described in this overview.

FIG. 2 depicts a right angle wall corner which incorporates corner blocks 48 which are alternated in direction at the corners as depicted in FIG. 2. The corner blocks 48 typically have a front face 50 and side face 52 (representative faces marked) and may include one or more vertical openings or throughbores 54 for receipt of pins that fit through vertically adjacent corner blocks 48 so that the corner will remain in substantially fixed alignment. The vertical openings or throughbores 54 are thus positioned so that the corner blocks 48 may be alternated, with the vertical openings 54 aligned at the corner.

Figure 5:
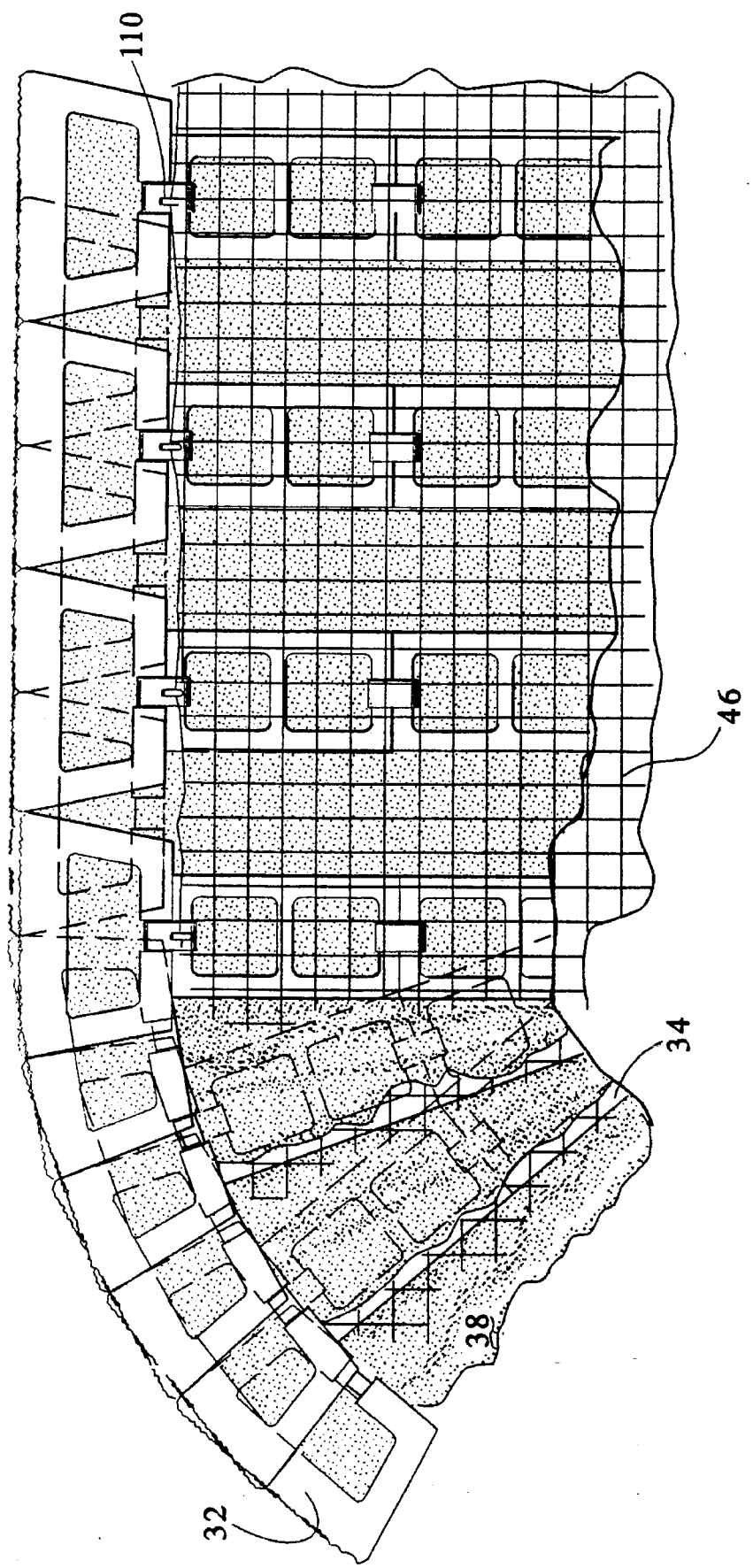
FIG. 5 is a top plan view of a wall construction wherein a convex curve is incorporated in the wall, and a soil reinforcing element is attached to the blocks.

Referring to FIG. 5, there is depicted, in a top plan view, the construction of a convex curve. It is necessary or preferred that the anchor blocks 34 associated with layers of facing blocks 32, forming the curve in the wall, be attached to alternating vertical courses distinct from the alternating vertical courses associated with the adjacent angled section of the wall. Thus, the anchor blocks 34, at least in the vicinity of the curve, may overlap as depicted in FIG. 5, thereby enabling the use of anchor blocks 34 with respect to curved or angled sections of a wall.

Figure 6:
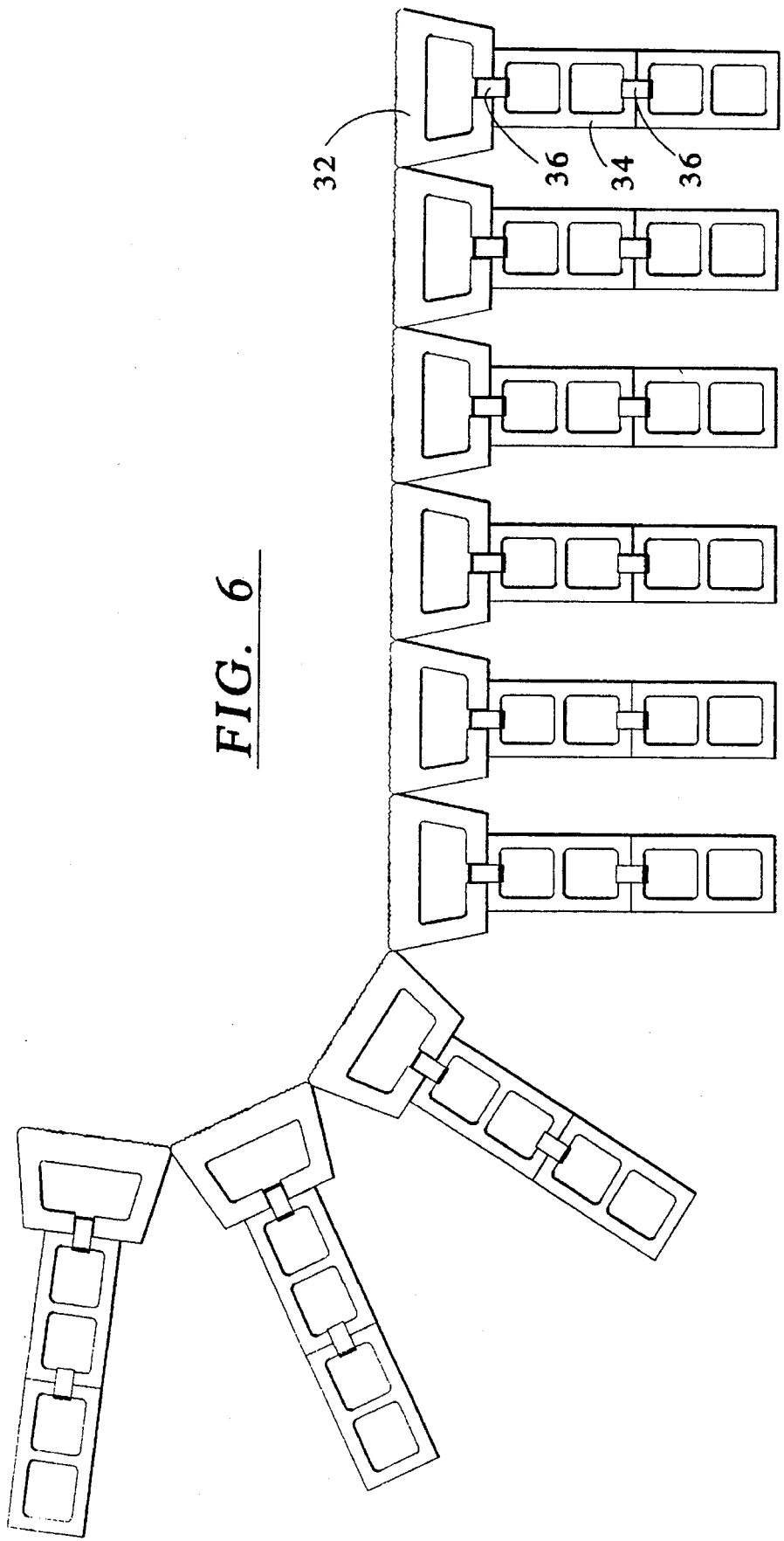
FIG. 6 is a top plan view of a wall of the invention wherein a concave curve is incorporated therein.

It should be noted that FIG. 2 depicts a right angle corner, while FIG. 5 depicts a convex curve. Other corners, curves and angles may be formed and the construction is not limited to a right angle corner and a convex curve. Wall sections may be joined at any angle. Intersections may be curved convexly as shown in FIG. 5. Intersections may form straight angles. Wall sections may join at an angle greater or less than 90° or 180° or be concave as depicted in FIG. 6. The arrangement of the anchor blocks 34 in combination with the facing blocks 32 is such that multiple wall sections forming complex walls can be constructed. In all events, the anchor blocks 34 should extend into particulate material 38 without interfering with each other, as in FIGS. 2 and 5, regardless of the curvature or corners formed in the wall by the facing blocks 32.

Block Constructions

Figure 7:
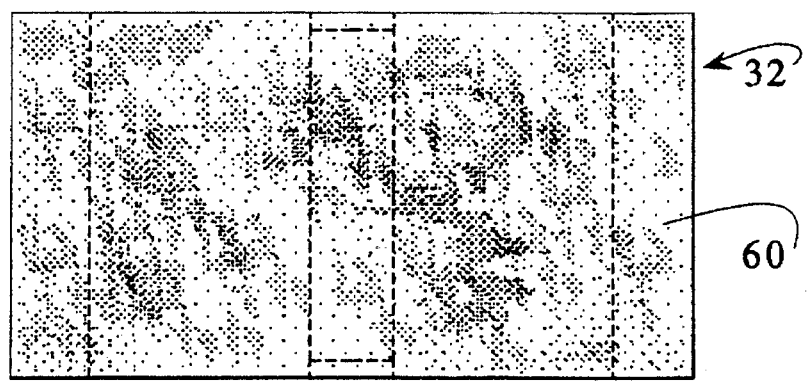
FIG. 7 is a front plan view of a typical facing block used to practice the invention.
Figure 8:
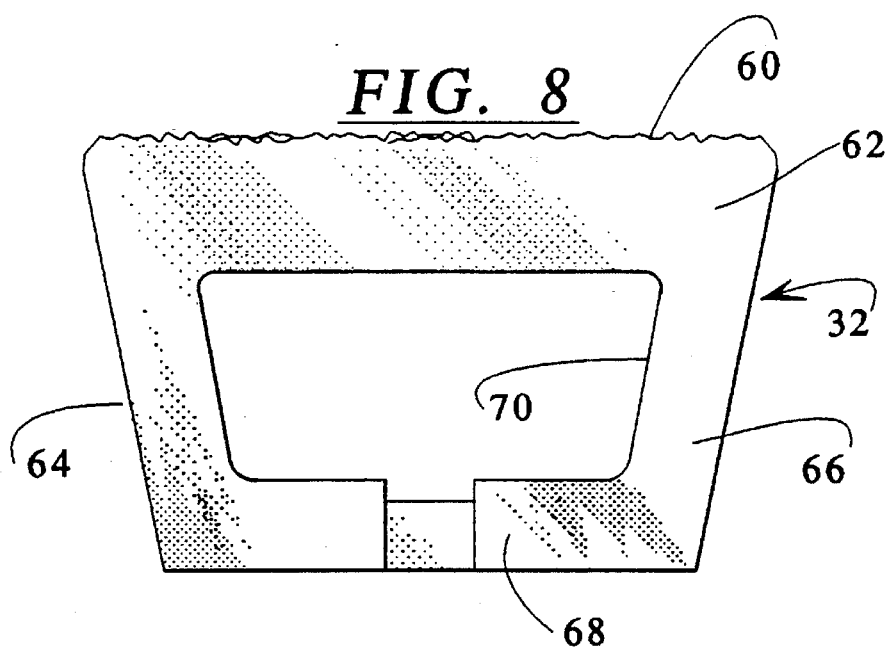
FIG. 8 is a top plan view of a typical facing block used to practice the invention.
Figure 9:
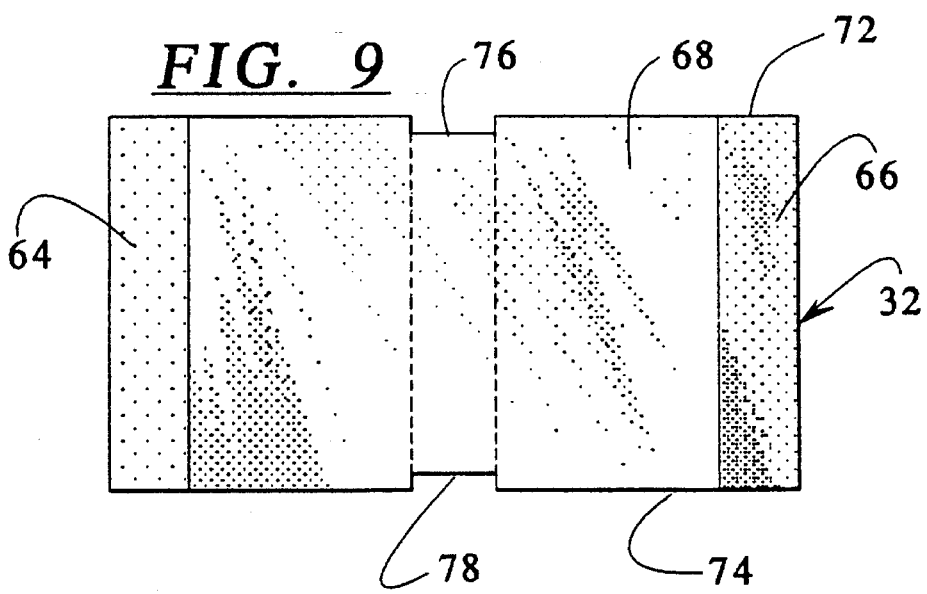
FIG. 9 is a rear plan view of the facing block of FIG. 7.

FIGS. 7, 8 and 9 illustrate the construction of a preferred embodiment of the facing blocks 32. As in FIGS. 6 and 7, a front face 60 is positioned on a front wall 62. Converging side walls 64 and 66 connect with a back wall 68 so that a top plan view configuration of the facing block 32 is generally that of a trapezoid. The front face 60 may be textured or configured in a number of ways. For example, the front face 60 may be generally planar. The front face 60 may be also in a convex or concave shape. The front face 60 may also have various shapes applied thereto or inserts applied therein.

A vertical throughbore 70 connects a top surface 72 with a bottom surface 74 of the facing block 32. The surfaces 72 and 74 are generally parallel to one another. The back wall 68 may include detents or slots 76 and 78 adjacent to top surface and bottom surface 72 and 74, respectively.

The height of the facing blocks 32 exceeds the height of the anchor blocks by a fraction of an inch. The profile of the front face 60 is generally that of a rectangle. The side walls 64 and 66 converge to enable formation of curved walls such as depicted in FIG. 5. The slots 76 and 78, as will be explained in greater detail below, are for cooperation with the fasteners or clips 36. The slots 76 or 78 are optional features in the facing blocks 32.

As shown in FIGS. 10–12, the anchor blocks 34 may comprise typical drycast, rectangular, concrete blocks. The anchor blocks 34 are generally of a rectangular, parallelpiped shape. Thus an anchor block 34 will include longitudinal side walls 80 and 82 joined together by transverse side walls 84 and 86. End flanges extend off the side walls 84, 86. An internal web or wall 88 connects the longitudinal walls 80 and 82 at their midpoint. Vertical throughbores 90 and 92 are defined by the arrangement of side walls 80, 82, side walls 84, 86 and web walls 88.

In an alternate block 34, the side walls 84 and 86 may include at their midpoints, either at the top or bottom thereof or in both positions, slots or detents 94 and 96 as shown in FIGS. 13–15. The slots 94 and 96 of anchor block 34 coact with fasteners 36 in the same manner as do slots 76 and 78 associated with the facing blocks 32. A side wall 84 or 86 coacts with a back wall 68 of a facing block 32 and is retained therewith by means of the fasteners or clips 36 in slots 76, 78, 94, 96 as discussed below.

The surfaces of walls 68, 84 and 86 preferably define planar contact surfaces so that the blocks 32, 34 will fit snugly against each other. The heights of the facing blocks 32 and alternate anchor blocks 34 of FIGS. 13–15 are preferably equal.

Fasteners

Figure 16:
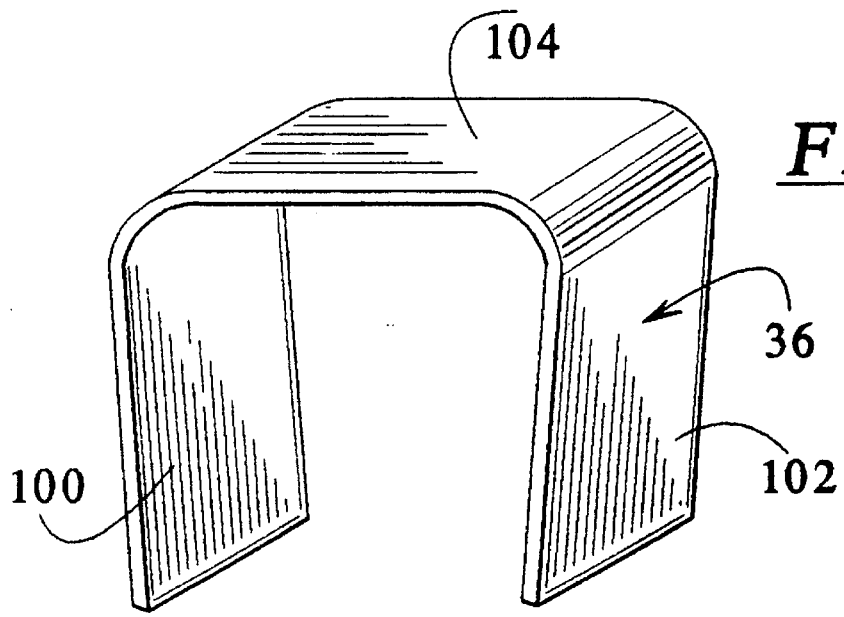
FIG. 16 is an isometric view of a typical clip or fastener used to attach separate facing and/or anchor blocks together.

FIGS. 16 through 27 illustrate various types of fasteners which are used to interconnect blocks 32, 34. Referring first to FIG. 16, there is illustrated a clip or fastener 36 which is comprised of a pair of opposed spaced legs 100 and 102 joined by a crown 104. The fastener or clip 36 is typically made of galvanized steel and the legs 100 and 102 are spring biased toward one another by the crown 104. The legs 100 and 102 may fit over adjacent side walls 84 and 86 of adjacent anchor blocks 34. Alternatively the clips 36 fit over an adjacent side wall 84 or 86 of anchor block 34 and back wall 68 of facing block 32 to connect them together as depicted in FIGS. 1–3, 5 and 6. The crown 104 may fit into slots 76 and 94 associated with the facing blocks 32 and alternate anchor blocks 34 when such slots 76, 94 are provided. One or two fasteners 36 may be used for each connection of blocks. That is, the fasteners 36 may connect the bottom and/or top of each pair of joined blocks. Connection at the top is preferred and depicted in FIGS. 1 and 3.

Figure 17:
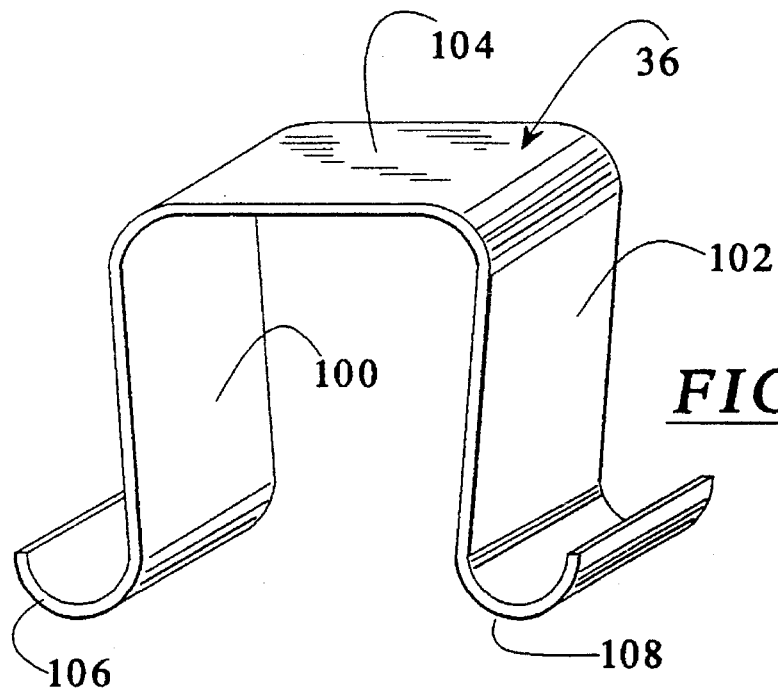
FIG. 17 is an isometric view of an alternate clip or fastener.
Figure 18:
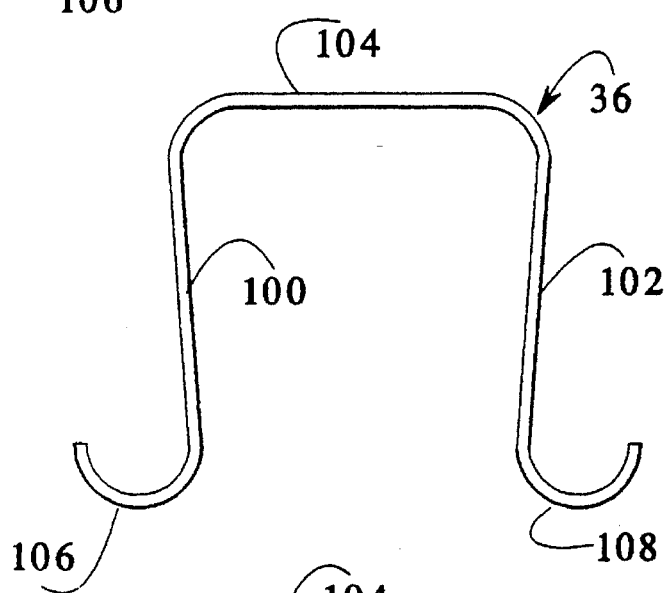
FIG. 18 is a front elevation of ,the clip of FIG. 17.
Figure 19:
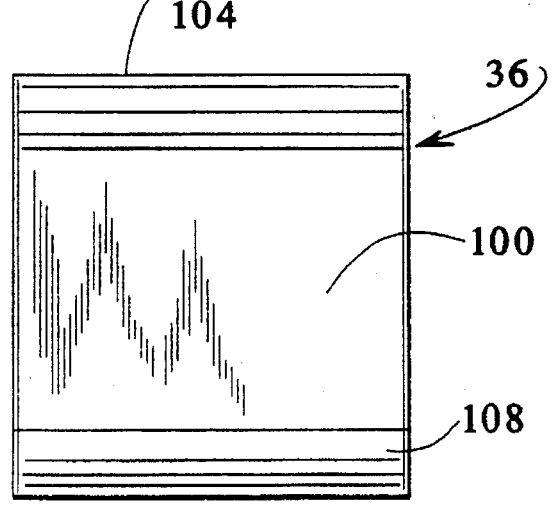
FIG. 19 is a side elevation of the clip of FIG. 17.

As depicted in FIGS. 17–19, an alternate fastener 36 may also have legs 100, 102 joined by a crown 104. A lower run 106 and 108 of each leg 100 and 102 is upwardly and outwardly curved.

Figure 20:
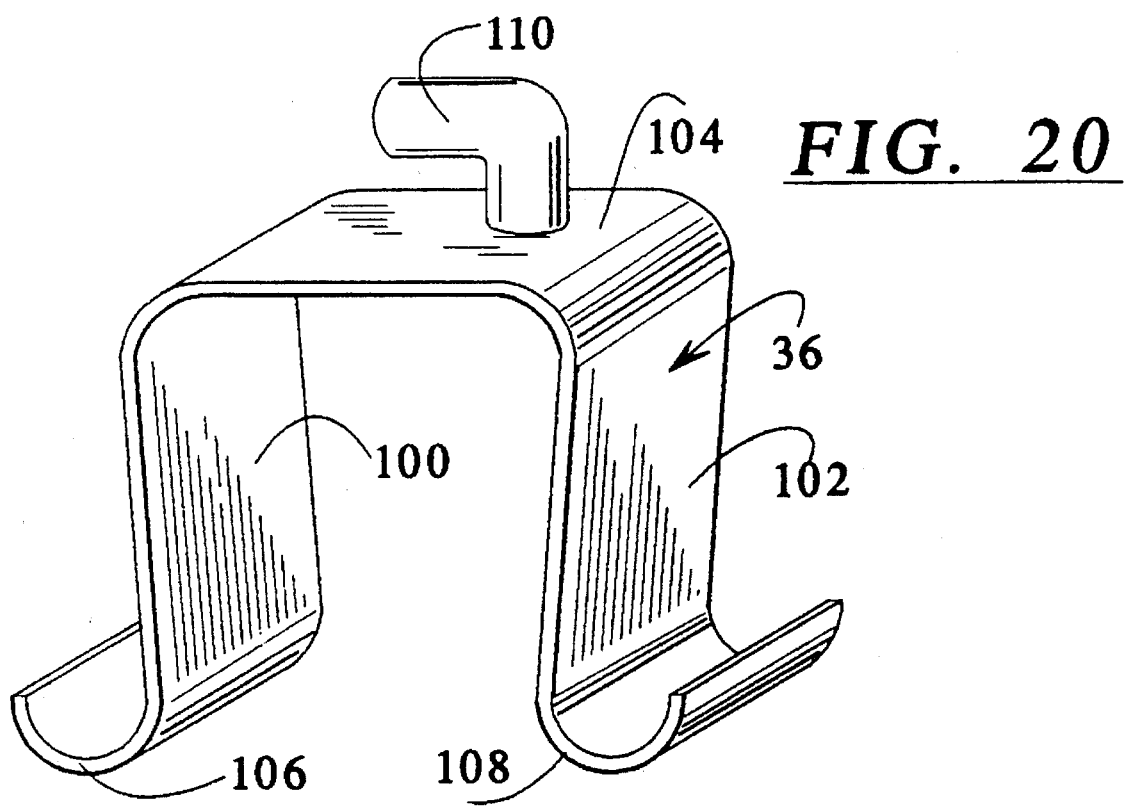
FIG. 20 is an isometric view of a second alternate clip design.

As depicted in FIG. 20, second alternate fasteners or clips 36 may include an upwardly extending pin 110 attached thereto which can coact with a soil reinforcing element such as a geogrid, geotextile, wire mesh or steel strip material 112 as shown in FIGS. 3 and 5 (one representative pin marked). The pin 110 may be hook shaped or otherwise shaped to coact with the geogrid material 112 or any other screening or earth stabilizing material or member. Pin or hook 110 is preferably positioned over the side wall 84 or 86 of anchor block 34, so it will not interfere with the adjacent stacked facing blocks 32.

FIGS. 21 and 22 illustrate another alternative construction for a fastener. Here the fastener 114 comprises a pair of opposed legs 116 and 118 joined by a crown 120. The legs 116 and 118 have an extent or height which is substantially equal to the depth or height of the back wall 68 of the facing block 32 and the side walls 84,86 of the anchor block 34. The legs 116 and 118 are biased toward each other by virtue of the construction of the crown 120. The legs 116 and 118 include inwardly projecting tabs 122 and 124, respectively, which tend to lock adjacent blocks 32 and 34 together by fitting over the walls, e.g. walls 68 and 84.

FIGS. 23 and 24 illustrate yet another construction for a fastener or clip. Here a rod or pin 126 connects spaced plates 128 and 130. The rod or pin 126 may be a nut and bolt fastener which is adjustable to thereby adjust the distance between the plates 128 and 130 and to thereby permit the plates 128 and 130 to be tightened. The pin 126 may fit within slots, such as slots 76 and 94 defined in the facing block 32 and anchor block 34 with the plates 128, 130 fitting against the walls 68, 80. As in FIG. 27, the pin 126 may have plates 128, 130 in the form of washers. Bolted connection may be made by placement through additional holes or slots (not shown) in the walls of the blocks.

FIGS. 25 and 26 illustrate yet another method or construction for a fastener. Here a flexible strap 132 is provided. The strap 132 is positioned around the back wall 68 and side wall 84. The ends of the strap 132 are configured with a buckle or latching mechanism 134 to thereby hold the anchor block 34 and facing block 32 or a pair of anchor blocks 34 together.

Numerous alternatives to the described block construction as well as the fasteners and the manner in which they may be stacked and interconnected are possible. Utilization of geogrid materials and other reinforcing materials to interconnect the facing blocks 32 and anchor blocks 34 may be varied in numerous ways. In all events, the simplicity of the construction is enhanced by the ability to use a simple facing block 32 construction in combination with an anchor block 34 construction of equal simplicity. The anchor block 34 construction is, in fact, of a type already commonly available. The retaining walls of the present invention are especially useful for low height gravity walls, for example walls up to six feet or thereabouts in height. With the present invention it is especially advantageous to construct such walls since they may be constructed manually. Thus, while there has been set forth a preferred embodiment of the invention, it is to be understood that the invention is to be limited by the following claims and their equivalents.

What is claimed is:

1. A retaining wall construction comprising, in combination:

a plurality of generally modular facing blocks arranged in courses with vertically adjacent blocks laterally overlapping one another, at least in part, to define a mosaic, said blocks each having a generally rectangular front face, a front wall defining the front face, a back wall spaced from the front wall with a hollow throughbore therebetween, and sidewalls joining the back wall to the front wall, said back wall defining a generally planar contact surface;

at least one precast, hollow core, generally rectangular parallelpiped, anchor block of the type having side walls defining generally planar contact surfaces with one of said contact surfaces of said anchor block positioned against the contact surface of a back wall of a facing block;

a separate fastener element for attaching a side wall of an anchor block to the back wall of a facing block, said fastener element extending from the hollow throughbore of a facing block to the hollow core of an anchor block; and fill material surrounding and filling the hollow anchor blocks and the region adjacent the back surface of the facing blocks.

2. The retaining wall of claim 1 including at least one additional anchor block with its side wall positioned against the side wall of the anchor block fastened to a facing block.

3. The retaining wall of claim 1 including soil reinforcing elements attached to blocks and extending into the fill material.

4. The retaining wall of claim 1 wherein the side walls of the facing block converge together from the front face.

5. The retaining wall of claim 1 further including a notch in the facing block back wall wherein the fastener includes a clip member which fits in the notch of the facing block back as well as inside of the anchor block.

6. The retaining wall of claim 1 including anchor blocks attached to alternate courses of facing blocks.

7. The retaining wall of claim 1 including vertical members extending through the hollow core of vertically adjacent facing blocks.

8. The retaining wall of claim 1 including granular particulate in the hollow core of the vertically adjacent facing blocks.

9. The retaining wall of claim 1 further including horizontal connecting cross members comprising means for interconnecting adjacent facing blocks.

10. The wall of claim 1 wherein the fastener comprises a flexible strap encircling the facing block back wall and anchor block side wall.

11. The wall of claim 1 wherein the fastener comprises a clip member including a crown joining a pair of legs and the legs are positioned to retain the facing block back wall and anchor block side wall therebetween and joined.

12. The wall of claim 1 wherein the fastener comprises a pin having flange members at its opposite ends and wherein the flange members are positioned to retain the facing block back wall and anchor block side wall therebetween and joined.

13. The wall of claim 1 defining a first wall section and further including facing blocks forming a second wall section at an angle with the first wall section and wherein the first wall section includes anchor blocks attached to facing blocks in a course of blocks different then the course of facing blocks to which anchor blocks are attached in the second wall section.

14. The retaining wall of claim 1 wherein the wall includes facing blocks forming a first wall section and facing blocks forming a connected second wall section at an angle to the first wall section.

15. The retaining wall of claim 1 wherein the wall includes facing blocks and anchor blocks of substantially equal height.

16. The retaining wall of claim 1 wherein the facing wall blocks are fabricated from dry cast concrete.

17. The retaining wall of claim 1 wherein the facing wall blocks have converging side walls, a generally flat planar front face, and a vertical hollow throughbore defining the front, back and side walls.

18. The retaining wall of claim 1 wherein the anchor block has a rectangular, parallelpiped shape with at least one throughbore from the top to the bottom surface and a height no greater than the height of the facing blocks.

19. The retaining wall of claim 18 wherein the hollow throughbores of the facing blocks and the throughbores of the anchor blocks are filled with concrete, the retaining wall further comprising a cast in place footing.

20. The retaining wall of claim 18 wherein the concrete is reinforced.

* * * * *